US009153961B2

(12) United States Patent
Rieux-Lopez et al.

(10) Patent No.: US 9,153,961 B2
(45) Date of Patent: Oct. 6, 2015

(54) INTERFACE DEVICE BETWEEN AN ELECTRICAL NETWORK AND CONSUMER SYSTEMS

(71) Applicant: Airbus Operations (SAS), Toulouse (FR)

(72) Inventors: Olivier Rieux-Lopez, Lisle sur Tarn (FR); Arnaud Plat, Plaisance du Touch (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 381 days.

(21) Appl. No.: 13/693,538

(22) Filed: Dec. 4, 2012

(65) Prior Publication Data

US 2013/0181509 A1  Jul. 18, 2013

(30) Foreign Application Priority Data

Dec. 5, 2011 (FR) ...................................... 11 61153

(51) Int. Cl.
*B60L 1/00* (2006.01)
*H02J 1/00* (2006.01)
(Continued)

(52) U.S. Cl.
CPC . *H02J 1/00* (2013.01); *B64D 31/00* (2013.01); *H02J 9/061* (2013.01); *H02M 3/335* (2013.01); *B64D 2221/00* (2013.01); *Y10T 307/406* (2015.04)

(58) Field of Classification Search
CPC . Y02T 10/7005; Y02T 10/7077; B60R 16/03; B60R 16/0315; B60L 11/14; H02J 9/06; H02M 3/04
USPC .......................................................... 307/9.1
See application file for complete search history.

(56) References Cited

U.S. PATENT DOCUMENTS 3,419,786 A * 12/1968 Brane .............................. 363/68
4,891,707 A *  1/1990 Dieterle et al. ............... 348/730
(Continued)

FOREIGN PATENT DOCUMENTS

| EP | 0706256 | 4/1996 |
| FR | 2895167 | 6/2007 |
| JP | 11089113 | 3/1999 |

OTHER PUBLICATIONS

Isolated DC-DC UPS based in a Forward-Forward Converter Analysis and Design, Flores, 2008; Cited in French Search Report.
(Continued)

*Primary Examiner* — Thienvu Tran
*Assistant Examiner* — Brian K Baxter
(74) *Attorney, Agent, or Firm* — Greer, Burns & Crain, Ltd.

(57) ABSTRACT

An interface device between an electrical network and energy consumer systems, including an input converter with a first winding connected on one side with a reverse blocking module and on the other with a first semiconductor chopper device, second and third windings having an end connected to output converters via first and second reverse blocking modules, and another end connected to the output converters, via a switching cell, a fourth winding having an end to be connected to the network, via a second semiconductor chopper device; and a control module for the semiconductor chopper devices. The interface device also includes a buffer capacitor having a first end connected to the output converters, and another end, to which a reference voltage is applied, isolated from the network; and a power reserve having an end to be connected to the network and another end connected to the fourth winding.

11 Claims, 4 Drawing Sheets

(51) Int. Cl.
*H02M 3/335* (2006.01)
*H02J 9/06* (2006.01)
*B64D 31/00* (2006.01)

(56) References Cited

U.S. PATENT DOCUMENTS

| | | | |
|---|---|---|---|
| 5,029,064 A * | 7/1991 | Ball | 363/65 |
| 5,109,185 A * | 4/1992 | Ball | 323/207 |
| 5,602,726 A | 2/1997 | Sakai | |
| 5,856,712 A * | 1/1999 | Suzuki et al. | 307/64 |
| 6,151,224 A * | 11/2000 | Lim et al. | 363/21.12 |
| 6,369,525 B1 * | 4/2002 | Chang et al. | 315/300 |
| RE41,965 E * | 11/2010 | West | 307/64 |
| 8,279,632 B2 * | 10/2012 | Wohrle | 363/21.01 |
| 2002/0154520 A1 * | 10/2002 | Mercier | 363/21.07 |
| 2004/0046457 A1 * | 3/2004 | Dumont et al. | 307/72 |
| 2006/0158908 A1 * | 7/2006 | Usui | 363/15 |
| 2006/0170288 A1 * | 8/2006 | Usui | 307/17 |
| 2007/0159421 A1 * | 7/2007 | Peker et al. | 345/82 |
| 2007/0189043 A1 * | 8/2007 | Lund et al. | 363/17 |
| 2008/0179956 A1 * | 7/2008 | Jiang et al. | 307/66 |
| 2008/0312579 A1 * | 12/2008 | Chang et al. | 604/20 |
| 2009/0179491 A1 * | 7/2009 | Ferguson et al. | 307/31 |
| 2009/0244944 A1 * | 10/2009 | Jang et al. | 363/126 |
| 2010/0109434 A1 * | 5/2010 | Kyono | 307/31 |
| 2010/0165670 A1 * | 7/2010 | Piazzesi | 363/21.12 |
| 2012/0007512 A1 * | 1/2012 | Kim et al. | 315/152 |
| 2012/0056549 A1 * | 3/2012 | Muramatsu et al. | 315/223 |
| 2013/0021827 A1 * | 1/2013 | Ye | 363/17 |

OTHER PUBLICATIONS

A new AC Power Supply Based on Series-Parallel Resonant Converter, Pinheiro, 1997; Cited in French Search Report.
French Search Report, Sep. 5, 2012.
European Search Report, Mar. 6, 2012.
"A high frequency triport topology for low power DC UPS", 1998, Manu Jain et al.

* cited by examiner

INTERFACE DEVICE BETWEEN AN ELECTRICAL NETWORK AND CONSUMER SYSTEMS

CROSS-REFERENCES TO RELATED APPLICATIONS

This application claims the benefit of the French patent application No. 1161153 filed on Dec. 5, 2011, the entire disclosures of which are incorporated herein by way of reference.

BACKGROUND OF THE INVENTION

The invention relates to an interface device between an electrical network and electrical energy consumer systems, notably on board an aircraft, for example an aeroplane.

Current electronic systems require an interface device between an electrical network and various consumer systems which accomplish functions required of them. This interface device enables a voltage delivered by a direct current electrical network or, by extension, resulting from the rectification of an alternating voltage originating from an alternating electrical network, to the different consumer systems, but also enables them to avoid the disturbances to which the electrical network is subject. These disturbances may be network power dropouts or a power voltage below a threshold. Below this threshold the interface device no longer operates satisfactorily. In the remainder of the description the term dropout will be used, but this also encompasses a network supply voltage below the threshold.

A power reserve function, for example a capacitor, enables electrical energy to be stored, and protection to be provided against dropouts. A galvanic isolation function enables the current between two electrical circuits electrically connected to one another to be prevented from flowing.

FIG. 1 illustrates a functional diagram which places an interface device 10 between a direct current electrical network RE and a consumer system 11. At the output of the interface device 10 a modified, isolated electrical network 12, which is protected against dropouts, is obtained in this manner. The main existing solutions in terms of architecture to produce such an interface device are as follows:
    use of two converter stages: the first to produce a galvanic isolation function, and the second to manage a power reserve function;
    use of a converter stage allowing management of a power reserve function, and possibly a galvanic isolation function.

In a first solution, two converter stages are used to obtain a regulated output voltage and a power reserve. An existing topology is illustrated in FIG. 2. This FIG. 2 shows several DC-DC output converters C1 to CN, for example of the "Buck" type. In the remainder of the description the term "several" means at least two. A converter of the "Buck" type, also called a serial voltage chopper, is a switched mode power supply which converts a direct current voltage into another direct voltage of lower value. As a variant, these output converters C1 to CN could be "Boost" type converters. A converter of the "Boost" type, also called a parallel chopper, is a switched mode power supply which converts a direct current voltage into another direct voltage of higher value.

Each output converter C1 to CN has two inputs; these two inputs are intended to be connected to an electrical network RE; for one of them the connection is made through a first switch 20. A capacitor Ctampon ["Cbuffer"] is connected between the two inputs of the output converters C1 to CN. These converters C1 to CN deliver regulated output voltages Vout1 to VoutN.

There is also a "Boost" type input converter 21 having two inputs connected to the electrical network RE and an output connected to an input of each of the output converters C1 to CN through a second switch 22, wherein this output is also connected to a terminal of a power reserve Cres, the other terminal of which is connected to a ground. The input converter 21 enables the power reserve Cres to be charged to a voltage higher than that delivered by the electrical network RE. The voltage delivered by the electrical network RE is called Vin.

The output converters C1 to CN enable galvanic isolation between the electrical network RE and the output voltages Vout1 to VoutN to be accomplished. They must adapt to the variations of voltage Vin of the electrical network RE, and to those of voltage Vres at the terminals of the power reserve Cres. To choose the power source of the output converters C1 to CN which accomplish the galvanic isolation it is necessary to put first and second switches 20 and 22 in place.

The first switch 20 enables the output converters C1 to CN to be disconnected from the electrical network RE, and second switch 22 enables the power reserve Cres to be connected at the input of the output converters C1 to CN. These switches 20 and 21 work in opposition. When the first switch 20 is closed, the output converters C1 to CN are powered directly by the electrical network RE. When the second switch 22 is closed, the output converters C1 to CN are powered by the electrical energy previously stored in the power reserve Cres.

The purpose of the capacitor Ctampon is to ensure that a voltage exists at the input of the output converters C1 to CN during transition phases. It is the case, indeed, that the switches 20 and 22 cannot be controlled in a strictly synchronous manner. These two switches 20, 22 therefore remain open at the same time, approximately 1 µs. Capacitor Ctampon, the value of which is much lower than that of the power reserve Cres, enables the output converters C1 to CN to be powered for several milliseconds.

This first solution has the following advantages:
    It is simple, and includes two separate converter stages.
    It enables a useful compromise to be found between the voltage at the terminals of the power reserve Cres and the volume it occupies.
    The establishment time of output voltage Vout1 to VoutN of the output converters C1 to CN does not depend on the charge of the power reserve Cres.
    The input converter 21 is dimensioned to provide only the power required to charge the power reserve Cres.
    Conversely, this first solution has the following disadvantages:
    It is bulky. It comprises, indeed, n+1 converters.
    It is impossible to control the current draw at start-up due to the structure of the input converter 21.
    The input voltage of the output converters C1 to CN, which accomplish the galvanic isolation, may be greater than the variation of the input voltage Vin of the electrical network RE.
    The losses during the switching of switch 22 are substantial; they are proportional to the capacity of capacitor Ctampon and switch 22 is subject to substantial stress during these phases.

In a second solution, a converter is used to obtain a regulated voltage. A widely used topology is illustrated in FIG. 3. In this figure an input converter of the "forward" or "flyback" type 30 has two inputs connected to the electrical network RE and two outputs connected at the input of each of the output converters C1 to CN. The "forward" type converter is also known by the name "convertisseur direct" [direct converter] in French. The "flyback" type converter is also known by the name "convertisseur a accumulation" [accumulation converter] in French.

The output converters C1 to CN are of the same nature as in the previous example. The power reserve Cres is connected between the two outputs of the input converter 30. The input converter 30 enables the voltages at the terminals of the power reserve Cres to be regulated, and may possibly accomplish the galvanic isolation. The power reserve Cres is placed at the output of this input converter 30, requiring a substantial capacitive volume, such that a minimum voltage Vres is guaranteed, at the terminals of the power reserve Cres, during a dropout. During a dropout phase in electrical network RE, the input converter 30 is no longer functional. The output power is supplied by the power reserve Cres, which is discharging. A bypass filtering capacitor Cin is connected to the terminals of the inputs of the input converter 30.

This second solution has the following advantages:
  It is simple. Indeed, it comprises a single input converter 30 having an operating range over the input voltage equal to the dynamic range of the electrical network.

Conversely, this second solution has the following disadvantages:
  The start-up time is greater than in the first solution, since the power reserve Cres must be charged for the interface to be functional.
  The input converter 30 must be dimensioned to guarantee the output power, but also charging of the power reserve Cres over the allowed time.
  In a steady state all the power supplied to the energy consumer systems cause losses in all converters 30 and C1 to CN.

In conclusion, there is the same number of converters in both solutions; in the first solution the input converter 21 does not provide galvanic isolation, and in the second solution input the converter 30 can provide galvanic isolation.

SUMMARY OF THE INVENTION

The aim of the present invention is to propose an interface device between an electrical network and several energy consumer systems which do not have the disadvantages mentioned above.

More specifically, one aim of the invention is to propose an interface device between an electrical network and several energy consumer systems which enables the galvanic isolation function and the function of consumer system protection against network power dropouts, or the presence of a power voltage below this threshold, to be accomplished simultaneously. If the network power is less than the threshold the energy consumer systems cannot operate satisfactorily.

Another aim of the invention is to propose an interface device between an electrical network and several energy consumer systems having a limited volume.

To accomplish this, the present invention relates to an interface device between a direct current or rectified alternating current network and energy consumer systems, including a DC-DC input converter, which is to be connected at the input of the network and several DC-DC output converters, which are to be connected at the output to the energy consumer systems. The input converter includes several magnetically coupled windings, positioned around a given magnetic core, among which:
  a first winding connected in a serial assembly on one side, with a reverse blocking module, and on the other with a first semiconductor chopper device, wherein the series assembly has two ends which are to be connected to the network;
  a second and a third windings, each having a first end connected to a first end of the output converters through, respectively, a first and a second reverse blocking modules, and a second end connected to a second input of the output converters through, in the case of the third winding, a switching cell, wherein this cell is controlled by a signal which is complementary to a signal signalling that the network is operating correctly;
  a fourth winding having an end which is to be connected to the network, through a second semiconductor chopper device.

The interface device also includes:
  a buffer capacitor having a first end connected to the first inputs of the output converters, and a second end, to which a reference voltage is applied, isolated from the network;
  a power reserve having an end which is to be connected to the network and a second end connected to the other end of the fourth winding.

The input converter also includes:
  a control module connected at its input to the first end of the buffer capacitor, and at its output to the first and to the second semiconductor chopper devices in order to control them, wherein this control module provides galvanic isolation of the output converters with regard to the network.

The input converter may include another switching cell installed between the second end of the second winding and the second inputs of the output converters, and controlled by the signal signalling that the network is operating correctly.

Each semiconductor chopper device and each switching cell may advantageously include a MOSFET component.

The control module preferably includes: a feedback loop, a PWM controller, a control stage and a diode OR gate, wherein the feedback loop is installed between the first terminal of the buffer capacitor and an input of the PWM controller, wherein an output of the PWM controller is connected at one input of the control stage, said control stage also receiving at another input the signal signalling that the network is operating correctly, wherein this control stage is connected at output to the first and second semiconductor chopper devices, and wherein the diode OR gate has a first input connected to the first semiconductor chopper device, a second input connected to the second semiconductor chopper device, and an output connected to another input of the PWM controller.

The feedback loop may include, in cascading fashion, a regulator stage and a galvanic isolation stage, wherein the regulator stage is connected to the buffer capacitor and the galvanic isolation stage is connected to the PWM controller.

The control stage may include:
  two AND gates, receiving respectively the signal signalling that the network is operating correctly, and its complementary signal, and a PWM signal delivered by the PWM controller, wherein the complementary signal is delivered at the output of an inverter receiving at input the signal signalling that the network is operating correctly.

The input converter may include, in addition, a first current measurement module installed between the first semiconductor chopper device and the network and a second current measurement module installed between the second semiconductor chopper device and the network.

The input converter is a "flyback" converter.

The power reserve advantageously includes at least one capacitor.

A Zener diode may be positioned at the terminals of the power reserve to protect it.

The first reverse blocking module may include a diode, or again a control module associated with one or more transistors, a switch, a mechanical relay or any other current unidirectional switch element.

The present invention also relates to an aircraft fitted with at least one interface device characterised in this manner.

DETAILED DESCRIPTION OF THE PREFERRED EMBODIMENTS

Figure 1:
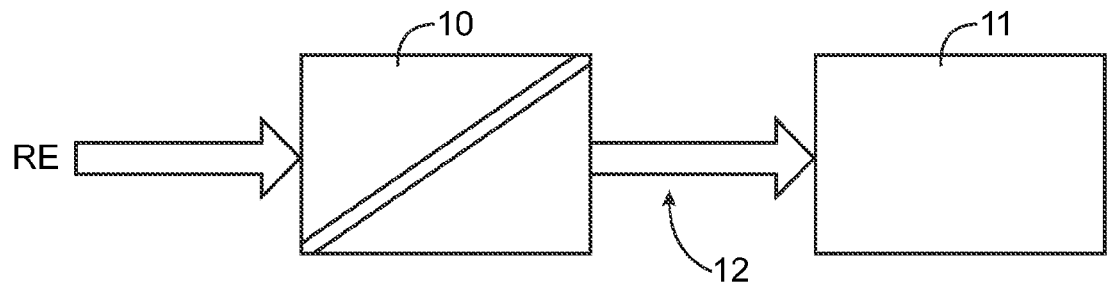
FIG. 1 illustrates the schematic diagram of an interface device between an electrical network and consumer systems.
Figure 2:
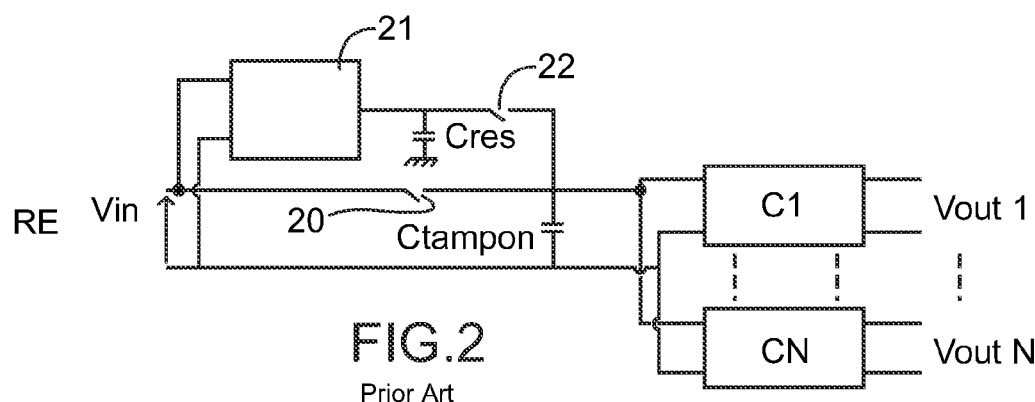
FIGS. 2 and 3 illustrate two solutions of the prior art.
Figure 3:
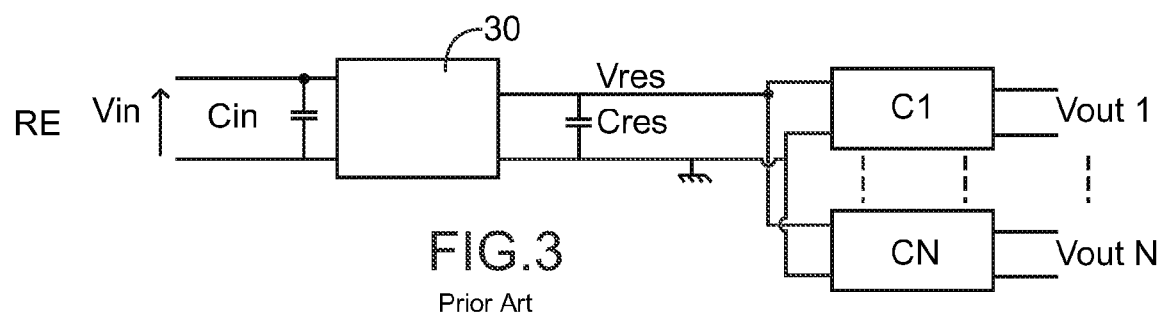
Figure 4:
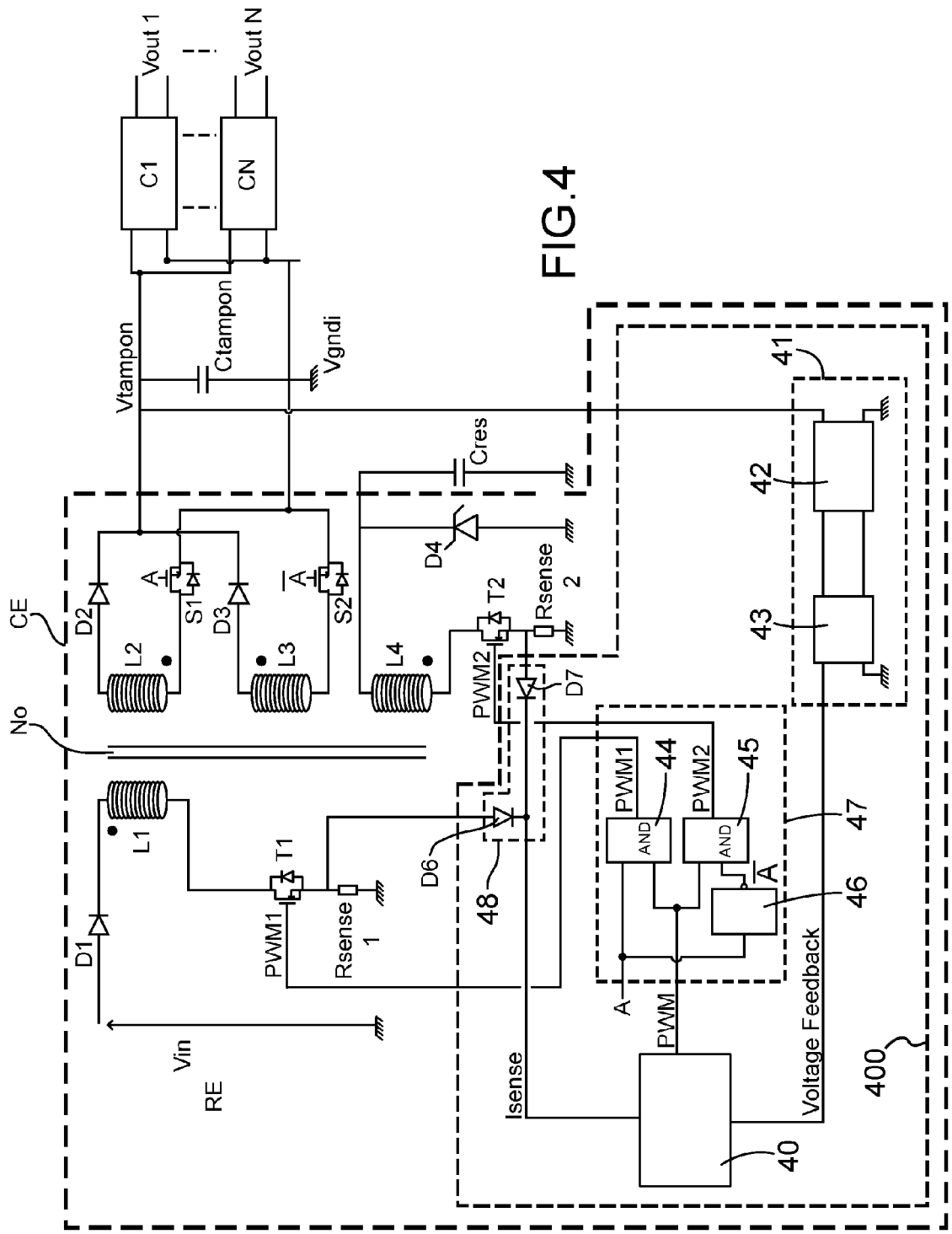
FIG. 4 illustrates a schematic diagram of the device of the invention.

Reference should be made to FIG. 4.

The interface device between a direct or rectified alternating current electrical network RE and energy consumer systems (not represented) according to the invention includes a DC-DC input converter CE including several magnetically coupled windings L1, L2, L3, L4 positioned around a single magnetic core No. The interface device also includes several DC-DC output converters C1 to CN having outputs which are to be connected to the energy consumer systems, and which co-operate with the input converter CE. As illustrated in FIG. 4, the windings of the input converter CE include the following:

a first winding L1 connected in a serial assembly with a first reverse blocking module D1, represented diagrammatically in this FIG. 4 by a diode, and a first semiconductor chopper device T1. In operation the serial assembly is connected to the network RE, between a first terminal and a second terminal of the network RE. Between these network terminals a voltage Vin is established.

The first reverse blocking module D1 is connected to one end of the first winding L1 and the first semiconductor chopper device T1 is connected to the other end of the first winding L1. A first current measurement module Rsense1 measuring a current flowing in the first winding L1, taking the form of a series resistance may be installed between the first semiconductor chopper device T1 and the associated terminal of the network. In the described example, the first reverse blocking module D1 is connected to the first terminal of the network RE, and the current measurement module Rsense1 is connected to the second terminal of the network RE.

a second and a third windings L2 and L3, each having a first end connected to first inputs of N output converters C1 to CN through, respectively, a second and a third reverse blocking modules D2 and D3, wherein these reverse blocking modules are represented diagrammatically by diodes. The second ends of the second and third windings L2 and L3 are connected to second inputs of the output converters C1 to CN through, respectively, a first and a second switching cells S1 and S2, wherein these two switching cells S1 and S2 are controlled by complementary signals A and $\overline{A}$. A is a signal signalling that the electrical network RE is operating correctly. Correct operation of the electrical network means that input voltage Vin is in a nominal operating range, and that the network is operating normally, without fault. Input voltage Vin is greater than or equal to a threshold below which the network RE is faulty. This fault may be a network power dropout. The first switching cell may be omitted.

a fourth winding L4 having a first end connected to the first end of a power reserve Cres and a second end connected to the electrical network RE, at the second terminal, through a second semiconductor chopper device T2.

A second current measurement module Rsense2 measuring a current flowing in the fourth winding L4, taking the form of a series resistance, may be installed between the second semiconductor chopper device T1 and the second terminal of the network RE. The other end of the power reserve Cres is connected to the second terminal of the network RE.

In a variant embodiment, second and third windings L2 and L3 may be replaced by a single winding associated with phase inversion circuits.

The input converter with its windings L1, L2, L3 and L4 advantageously forms a "flyback" converter.

The interface device also includes a buffer capacitor Ctampon having a first end connected to a reference voltage Vgndi isolated from network RE, and a second end connected to the second inputs of the N output converters C1 to CN. This buffer capacitor Ctampon is used during transition phases between a phase of powering of the output converters C1 to CN by network RE, and a phase of powering of the output converters C1 to CN by energy stored in the power reserve Cres, and vice versa.

In the example embodiment illustrated in FIG. 4, semiconductor chopper devices T1 and T2 and switching cells S1 and S2 can each be formed by a MOSFET component.

The first reverse blocking module D1 enables the power supply of the network RC to be disconnected during a dropout, and prevents power from the power reserve Cres reaching the network RE.

The reverse blocking modules D2, D3 prevent power from the buffer capacitor Ctampon reaching the network RE.

As a variant, the first reverse blocking module D1 could be formed by one or more transistors, a switch, a mechanical relay or any other current unidirectional switch element, and by a control module to control them. These elements are not illustrated, in order not to increase needlessly the number of figures.

The power reserve includes at least one capacitor Cres. A Zener diode D4 may be positioned at the terminals of the power reserve Cres to protect it.

The input converter also includes a control module 400 which receives the voltage at the terminals of the buffer capacitor Ctampon and which controls first and second semiconductor chopper devices T1 and T2. The control module 400 is connected at input to the first end of the buffer capacitor Ctampon and at output to first and to second semiconductor chopper devices T1, T2. The control module 400 includes at least one PWM controller 40, one feedback loop 41, one control stage 47 and one diode OR gate 48.

The feedback loop 41 is installed between the first terminal of the buffer capacitor Ctampon and an input of the controller PWM 40.

The feedback loop 41 includes two cascading stages: a regulator stage 42 which has one input connected to the first terminal of the buffer capacitor Ctampon and an output connected to an input of the galvanic isolation stage 43, wherein this galvanic isolation stage has an output connected to an input of the PWM controller 40. Both these stages 42, 43 are, for example, circuits recommended by the manufacturers of PWM controller 40.

The regulator stage 42 may be, for example, a PI (Proportional Integral) corrector, or a PID (Proportional Integral and Derived) corrector.

The galvanic isolation stage 43 may be, for example, an optocoupler. It allows signals to be transferred between two parts of electronic circuits which are electrically isolated from one another.

The diode OR gate 48 includes two diodes D6 and D7. It has two inputs, one connected to the first semiconductor chopper device T1 and the other to the second semiconductor chopper device T2, and an output connected at the input of PWM controller 40. More specifically, the anode of the first diode D6 of the OR gate 48 is connected at a common point to the first semiconductor chopper device T1 and to the first current measurement module Rsense1. The anode of the second diode D7 of the OR gate 48 is connected at a common point to the second semiconductor chopper device T2 and to the second current measurement module Rsense2. The anodes of diodes D6, D7 constitute the two inputs of the OR gate. The cathodes of diodes D6, D7 are connected to one another, and constitute the output of the OR gate 48. The output of the diode OR gate 48 is connected to a second input of the PWM controller 40. The diode OR gate delivers a current Isense which is equal either to the current flowing in the first winding L1, or to the current flowing in the fourth winding L4.

The PWM controller 40 delivers at output a PWM signal which is injected at the input of the control stage 47. The control stage 47 includes: two AND gates 44, 45 and an inverter 46.

Each of the AND gates 44, 45 has an input connected to the output of the PWM controller 40. The other input of the first AND gate 44 receives signal A signalling that the network RE is operating correctly. The output of the first AND gate 44 is connected to the first semiconductor chopper device T1. The latter can be in an open or closed state, depending on a control signal PWM1 delivered by the first AND gate 44. The outputs of the AND gates 44 and 45 also form the inputs of the control module 400.

The inverter 46 receives signal A at input and delivers complementary signal $\overline{A}$. This complementary signal $\overline{A}$ is applied to control the second switching cell S2. It signals that the network is operating poorly, or a dropout or a Vin voltage below the threshold.

The other input of the second AND gate 45 receives complementary signal $\overline{A}$; it is connected to the output of the inverter 46. The output of the second AND gate 45 is connected to the second semiconductor chopper device T2. The latter can be in an open or closed state, depending on a control signal PWM2 delivered by the second AND gate 45.

This interface device can be used in two different operating modes:
 a first operating mode or charging phase, which enables the power reserve Cres to be charged, and the output power to be supplied from the network RE.
 a second operating mode or discharging phase, which enables the output power to be supplied from the power reserve Cres.

First Operating Mode: Nominal Operation

In the first operating mode it is considered that network voltage Vin is in its nominal operating range. The network RE is operating normally. Signal A is therefore activated, the effect of which is:
 to generate signal PWM1 at the output of the control module 400 and therefore to close the first semiconductor chopper device T1,
 to open the second semiconductor chopper device T2,
 to close the first switching cell S1,
 to open the second switching cell S2.

In this operating mode a standard "flyback" converter is found with two secondary windings, i.e. second and fourth windings L2 and L4:
 the second winding L2 to power the output converters C1 to CN and therefore to supply output voltages Vout1 to VoutN,
 the fourth winding L4 to charge the power reserve Cres,
 the third winding L3 is considered as disconnected since the second switching cell S2 is open.

Figure 5:
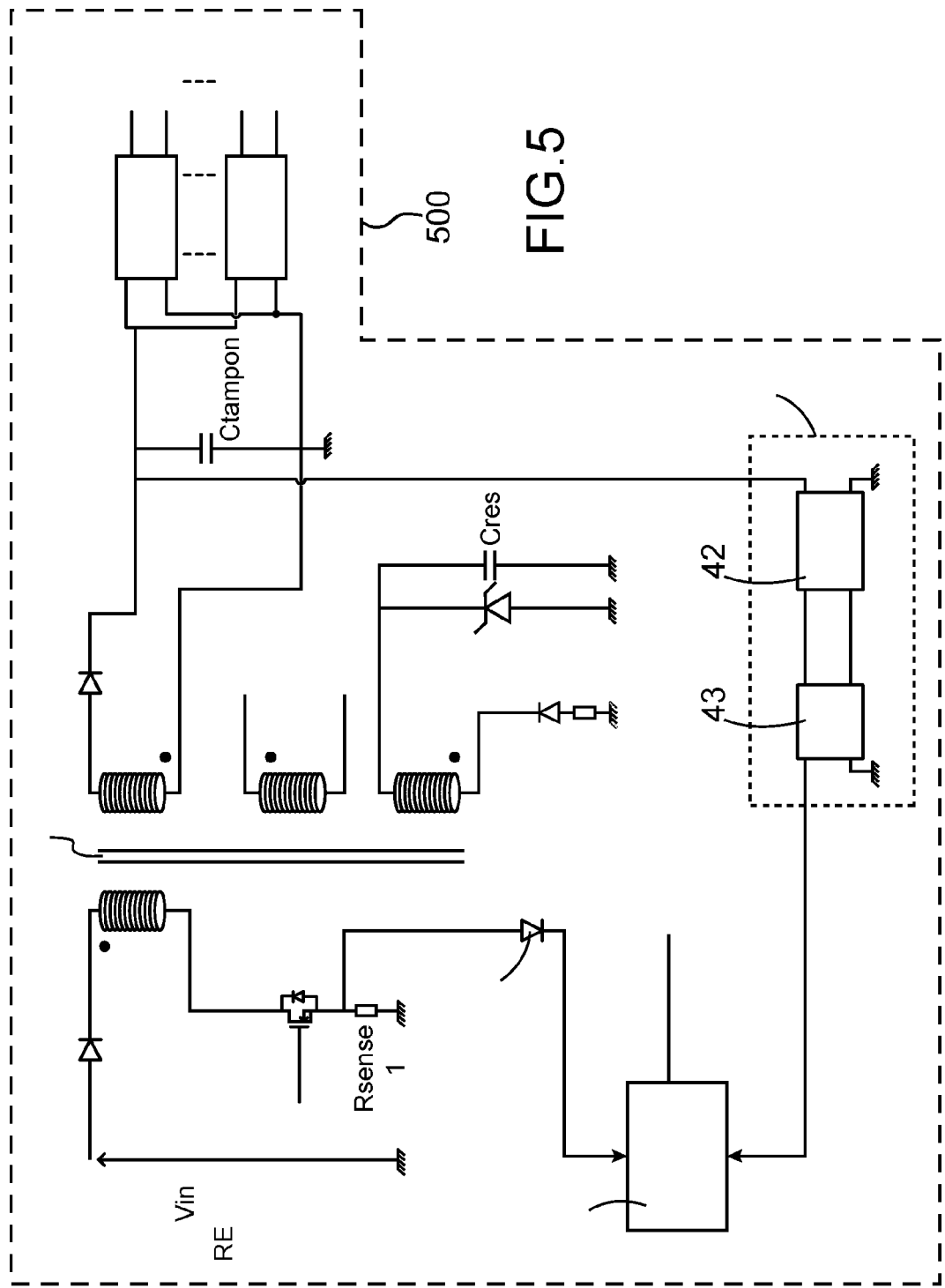
FIGS. 5 and 6 illustrate the equivalent diagram of the device of the invention, in two different operating modes.

The diagram of FIG. 4 can be simplified as in the diagram of FIG. 5.

The "flyback" converter is regulated in relation to voltage Vtampon at the terminals of the buffer capacitor Vtampon in order to guarantee its accuracy and stability. The power reserve Cres is charged by cross-regulation. This means that one of the outputs of the input converter CE can be controlled by the control module 400; the other will be regulated according to the intrinsic operation of the coupled magnetic windings positioned around same core No.

The Zener diode D4 is therefore used to limit the excess voltages at the terminals of the power reserve Cres in the event of an abrupt load change in the output voltage.

Second Operating Mode: Operation in Transparency Mode

In the second operating mode it is considered that the network voltage Vin is outside its nominal operating range. Signal A signalling that the network RE is operating correctly is therefore deactivated, the effect of which is:
 to generate signal PWM2 at the output of the control module 400 and therefore to close the second semiconductor chopper device T2,
 to open the first semiconductor chopper device T1,
 to close the second switching cell S2,
 to open the first switching cell S1.

In this operating mode the operation of the "flyback" converter is changed. The power reserve Cres is used as an energy source to power the output converters C1 to CN instead of the network RE. There is only a single useful secondary winding, namely the third winding L3:
 and this third winding L3 enables voltage Vtampon to be supplied at the input of the output converters C to CN.
 and the second winding L2 is considered as disconnected, since the first switching cell S1 is open.
 and the first winding L1 is considered as disconnected, since the first chopper cell T1 is open.

Figure 6:
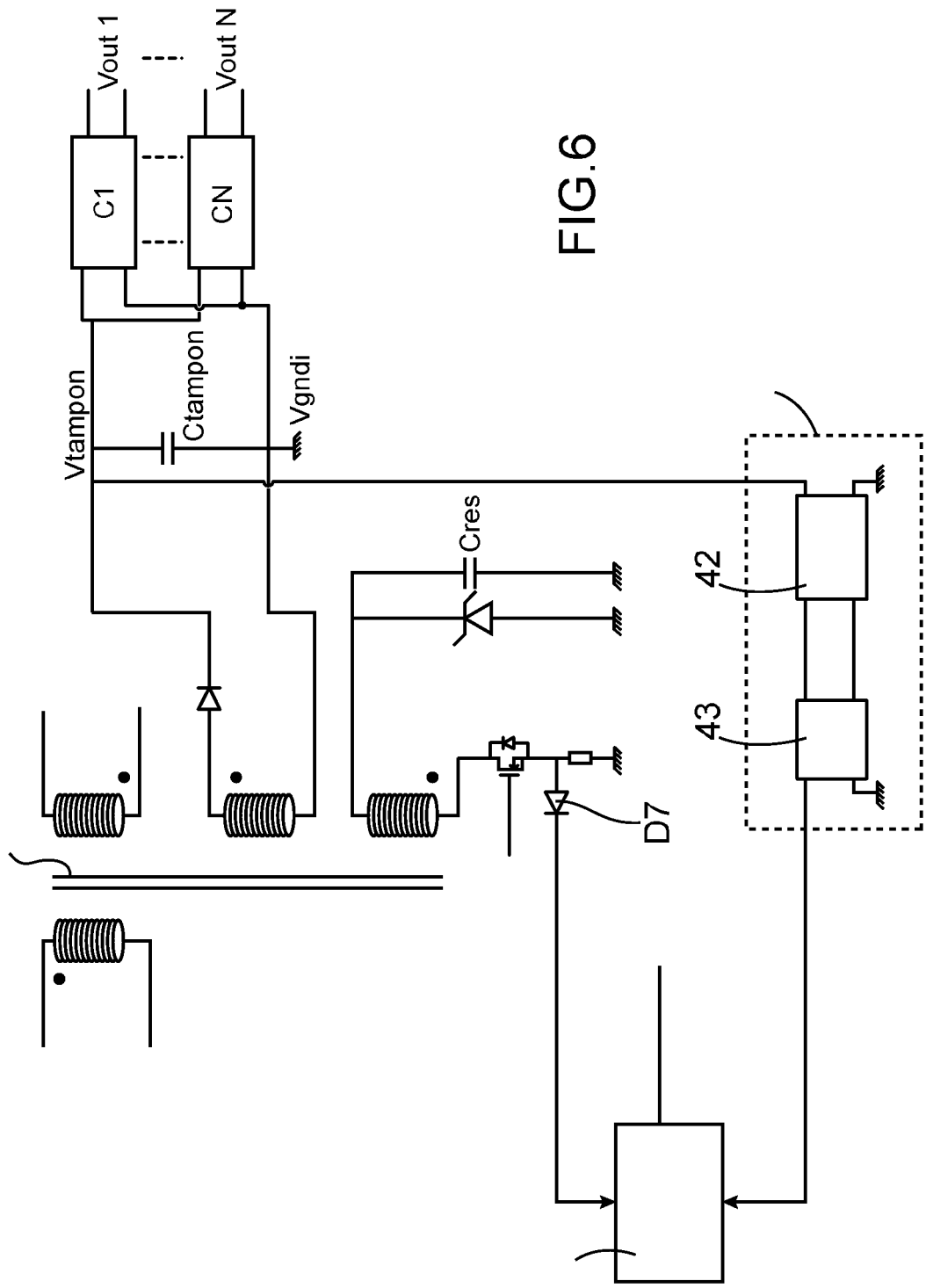

The diagram of FIG. 4 can therefore be simplified as in the diagram of FIG. 6.

The "flyback" converter is always regulated in relation to voltage Vtampon at the terminals of the buffer capacitor Ctampon.

Transition Phase Between these Two Operating Modes:

The stability of the voltage at the input of the output converters C1 to CN is guaranteed due to the presence of the buffer capacitor Ctampon. Its function is:
 to guarantee a residual ripple in the input voltage of the output converters C1 to CN in nominal operation and
 to guarantee a tolerance in relation to the input voltage of the output converters C1 to CN during the phase of transition between the two modes.

The interface device of the invention has several possible variants:

effecting a synchronous rectification of the input voltage of the output converters, if there are strong currents. In this case it is useful to synchronise the synchronous rectification for the second reverse blocking module D2 and for the second semiconductor chopper device T2 in order to improve the cross-regulation.

eliminating the first switching cell S1 since the second reverse blocking module D2 is spontaneously blocked during the phase in which the first switching cell S1 is open.

The present invention also relates to an aircraft which includes at least one interface device according to the invention. The aircraft is represented diagrammatically in FIG. 5 with reference 500.

The advantages of the invention are as follows:

A single magnetic element is required to manage both functions: galvanic isolation and power reserve, leading to space-saving, reduced mass and lower cost.

A single PWM controller and a single feedback loop are required, which leads to simplicity of use and space-saving.

Optimisation of the voltage at the terminals of the power reserve and of the capacitive volume is possible.

The chopper semiconductor devices must be dimensioned only for transient operation: namely the power reserve charging time, and the duration of the dropouts.

There is no requirement for the switching cells to be high-performance in terms of their dynamic range: resistance Rdson (or drain-source resistance when the MOSFET component is in its on state) and drain-source voltage Vds (Vds=RdsonxIds) with drain-source current Ids are the only dimensioning factors.

The input voltage of the output converters is regulated and enables the operation of the N output converters to be optimised.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An interface device between a direct or rectified alternating current electrical network and energy consumer systems, including a DC-DC input converter which is to be connected at input of the network, and several DC-DC output converters to be connected at input of the energy consumer systems, wherein the input converter includes several magnetically coupled windings, positioned around the same magnetic core, among which:

a first winding connected on one side with a reverse blocking module, and on the other side with a first semiconductor chopper device, so that the reverse block module, the first winding, and the first semiconductor chopper device form together a serial assembly having two ends which are to be connected to the network;

second and third windings, each having a first end connected to a first end of the output converters through, respectively, first and second reverse blocking modules, and a second end connected to a second input of the output converters through, in the case of the third winding, a switching cell, wherein this cell is controlled by a signal which is complementary to a signal signaling that the network is operating correctly;

a fourth winding having an end which is to be connected to the network, through a second semiconductor chopper device;

and wherein the interface device also includes:

a buffer capacitor having a first end connected to the first inputs of the output converters, and a second end, to which a reference voltage is applied, isolated from the network;

a power reserve having an end which is to be connected to the network and a second end connected to the other end of the fourth winding;

and wherein the input converter also includes:

a control module connected at its input to the first end of the buffer capacitor, and at its output to the first and to the second semiconductor chopper devices in order to control them, wherein this control module provides galvanic isolation of the output converters with regard to the network, and wherein the input converter includes another switching cell installed between the second end of the second winding and the second inputs of the output converters, and controlled by the signal signaling that the network is operating correctly.

2. A device according to claim 1, wherein each semiconductor chopper device and each switching cell includes a MOSFET component.

3. A device according to claim 1, wherein the control module includes: a feedback loop, a PWM controller, a control stage and a diode OR gate, wherein the feedback loop is installed between the first terminal of the buffer capacitor and an input of the PWM controller, wherein an output of the PWM controller is connected at input of the control stage, also receiving at its input the signal signaling that the network is operating correctly, wherein this control stage is connected at an output to the first and second semiconductor chopper devices, and wherein the diode OR gate has a first input connected to the first semiconductor chopper device, a second input connected to the second semiconductor chopper device, and an output connected to another input of the PWM controller.

4. A device according to claim 3, wherein the feedback loop includes, in cascading fashion, a regulator stage and a galvanic isolation stage, wherein the regulator stage is connected to the buffer capacitor and the galvanic isolation stage is connected to the PWM controller.

5. A device according to claim 1, wherein the control stage includes two AND gates, receiving respectively the signal signaling that the network is operating correctly, and its complementary signal, and a PWM signal delivered by the PWM controller, wherein the complementary signal is delivered at the output of an inverter receiving at input the signal signaling that the network is operating correctly.

6. A device according to claim 1, wherein the input converter includes, in addition, a first current measurement module installed between the first semiconductor chopper device and the network and a second current measurement module installed between the second semiconductor chopper device and the network.

7. A device according to claim 1, wherein the input converter is a flyback converter.

8. A device according to claim 1, wherein the power reserve includes at least one capacitor.

9. A device according to claim 1, wherein a Zener diode is positioned at the terminals of the power reserve to protect it.

10. A device according to claim 1, wherein the first reverse blocking module includes one of a diode, a control module associated with one or more transistors, a switch, a mechanical relay and any other unidirectional current switch element.

11. An aircraft including at least one device according to claim 1.

* * * * *